United States Patent
von der Weid et al.

(10) Patent No.: US 8,577,223 B2
(45) Date of Patent: Nov. 5, 2013

(54) OPTICAL COMMUNICATIONS APPARATUS

(75) Inventors: Jean Pierre von der Weid, Rio de Janeiro (BR); Claiton Pereira Colvero, Rio de Janeiro (BR); Mauro Cezar Rebello Cordeiro, Rio de Janeiro (BR)

(73) Assignee: Ericsson Telecomunicações S.A., São Paulo-SP (BR)

( * ) Notice: Subject to any disclaimer, the term of this patent is extended or adjusted under 35 U.S.C. 154(b) by 313 days.

(21) Appl. No.: 12/810,370

(22) PCT Filed: Dec. 27, 2007

(86) PCT No.: PCT/BR2007/000363
§ 371 (c)(1),
(2), (4) Date: Oct. 18, 2010

(87) PCT Pub. No.: WO2009/082789
PCT Pub. Date: Jul. 9, 2009

(65) Prior Publication Data
US 2011/0026933 A1 Feb. 3, 2011

(51) Int. Cl.
*H04B 10/25* (2013.01)
*H04B 10/40* (2013.01)

(52) U.S. Cl.
USPC .......................................... 398/131; 398/139

(58) Field of Classification Search
USPC ......................................... 398/159, 161, 131
See application file for complete search history.

(56) References Cited

U.S. PATENT DOCUMENTS

| | | | |
|---|---|---|---|
| 3,828,185 A * | 8/1974 | Vandling | 398/170 |
| 4,236,790 A | 12/1980 | Smith | |
| 6,205,266 B1 | 3/2001 | Palen et al. | |

FOREIGN PATENT DOCUMENTS

| | | |
|---|---|---|
| GB | 2131245 A | 6/1984 |
| JP | 59015206 A | 1/1984 |
| JP | S59-81936 A | 5/1984 |
| JP | 2000-111816 A | 4/2000 |

* cited by examiner

*Primary Examiner* — Leslie Pascal
(74) *Attorney, Agent, or Firm* — Coats & Bennett, P.L.L.C.

(57) ABSTRACT

An FSO transceiver (4) comprising a body (6), at least one lens (9) fixed to the body in a first position (C) and means for attaching a connector (11) for an optical fiber (3) at a second position (B) at a predefined distance (Zbc) to the lens, the lens being adapted to converge rays (8) of light sent to the FSO transceiver via free space into the optical fiber. The means for attaching the connector is a temperature compensation device (10) having an expansion coefficient being higher than an expansion coefficient of the body and that the temperature compensation device is fixed to the body in a third position (A) and has a free end which allows the temperature compensation device to expand or contract according to temperature changes, and that the second position is positioned between the third position and the first position.

14 Claims, 10 Drawing Sheets

OPTICAL COMMUNICATIONS APPARATUS

TECHNICAL FIELD

The present invention generally relates to an FSO (Free Space Optics) transceiver, which also can be termed as an FSOC (Free Space Optics Communications) transceiver or FSOL (Free Space Optics Links) transceiver.

BACKGROUND

FSO, FSOL or FSOC systems offer several advantages, such as large bandwidth, when compared to state-of-the-art free space radio frequency systems. FSO communications systems constitute an excellent choice in many new projects of high-transmission short links, among other things due to the free electromagnetic spectrum for utilization and the complete immunity to radio frequency interference as compared to radio systems. On the other hand, FSO systems are much more sensitive to atmospheric conditions such as mist, fog and refractive turbulence. These conditions cause higher intensity fading in the received optical signals than in radio waves.

Misalignment between two communicating FSO transceivers caused by e.g. building sway, seismic activity, hail and birds landing on the FSO transceivers, is another problem with FSO systems. This problem is addressed in U.S. Pat. No. 7,120,363-B2, wherein a method for automatic alignment of two FSO transceivers is disclosed. The FSO transceivers comprise optical elements, for example, optical signal generators, optical signal detectors and lenses for sending and receiving signals from optical fibers connected and comprised in the FSO transceivers. The optical elements are secured in a gimbal or optical cage, through which adjustment of both the azimuth and elevation of the optical elements is possible with the help of linear motors and a control device.

However there are further problems with FSO systems, one of them being caused by temperature fluctuations in the environment of FSO devices such as FSO transceivers. The manufacture of a completely optical communications device based on the utilization of a lens and an optical fiber, such as an FSO transceiver is rather complicated, considering that in an optical fiber the core diameter typically is a few micrometers and should receive all the concentrated energy that a relatively large area lens has captured. The distance between the lens and the optical fiber is very critical and should ideally be kept constant in any condition of a link in order to assure sufficient power levels. This is difficult to achieve in practice since the FSO transceivers are heated or cooled as a result of the weather conditions prevailing where they are positioned, since the parts in the FSO transceiver are expanded and contracted so that said critical distance is altered.

SUMMARY

It is an object of the invention to decrease at least the above problem caused by temperature fluctuations affecting an FSO transceiver.

The invention relates to an FSO transceiver comprising a body, at least one lens fixed to the body in a first position and means for attaching a connector for an optical fiber at a second position at a predefined distance to the lens, the lens being adapted to converge rays of light sent to the FSO transceiver, via free space, into the optical fiber. The means for attaching the connector is a temperature compensation device having an expansion coefficient being higher than an expansion coefficient of the body. The temperature compensation device is fixed to the body in a third position and has a free end which allows the temperature compensation device to expand or contract according to temperature changes. The second position is positioned between the third position and the first position. Hereby is achieved that although the length of the body and hence the position of the lens changes with respect to the third position due to changes in ambient temperature, the corresponding distance change between the first and the second position becomes less than if the means for attaching the connector in the body had been of the same material as the body. Thus the distance change between the lens and the connector due to an ambient temperature change is at least to some degree compensated for.

The body is in one embodiment tubular and the lens and the temperature compensation device are attached inside the body. Hereby is achieved that the body protects the lens and the temperature compensation device from e.g. pollution and at the same time provides a compact FSO transceiver.

For such an embodiment the temperature compensation device may be a tubular, single-piece element comprising a generally cylindrical envelope surface having a smaller diameter than an inner wall of the body and an abutment for the connector inside the temperature compensation device. Hereby is achieved that the temperature compensation device can be manufactured relatively easy and that the connector can be installed in the temperature compensation device inside the body, which enables the connector to better protect the end of the optical fiber from e.g. precipitation.

The envelope surface may comprise at least one circumferential groove for retention of an O-ring for each circumferential groove. Hereby a more precise guidance of the free end of the temperature compensation device is achieved during expansion or contraction since the diameter of the temperature compensation device is smaller than the diameter of the inner wall of the body.

The FSO transceiver may comprise a manually operated fine setting arrangement for adjusting a direction of the FSO transceiver. Hereby is achieved that the alignment of the FSO transceiver can be manually adjusted although the FSO transceiver already has been attached to an anchoring support. Also, by having a manually operated fine setting arrangement instead of automatically controlled adjustment mechanisms, the necessity of expensive electric motors and electronic control units is avoided.

The FSO transceiver may comprise a protection device which is adapted to at least partly protect the lens from precipitation. Hereby is achieved that maintenance of the FSO transceiver does not have to be as frequent as in the case where the lens is exposed to precipitation.

The FSO transceiver may comprise a mounting rail on the body for a telescopic sight. Hereby is achieved that a telescopic sight may be mounted on the FSO transceiver in order to assist a person to align the FSO transceiver with e.g. an opposite FSO transceiver.

The body may be made of an aluminum alloy and the temperature compensation device may be made of a polymer material. More specific, the body may be made of a 6000 series aluminum alloy and the temperature compensation device may be made of polypropylene. Even more specific, the body may be made of aluminum alloy 6061 and the temperature compensation device may be made of polypropylene copolymer. Hereby a light-weight and low-cost FSO transceiver with improved compensation for temperature changes is enabled.

The ratio between the expansion coefficients of the body and the temperature compensation device may be substantially the same as the ratio between the distance from the third position to the second position and the distance from the third position to the first position. This enables the distance between the lens and the optical fiber to be substantially maintained even though the ambient temperature varies, at least in a temperature range where the expansion coefficients of the body and the temperature compensation device respectively, are substantially constant.

The FSO transceiver may be passive. Hence a low-cost FSO transceiver with few parts and without complicated electronics is enabled.

BRIEF DESCRIPTION OF THE DRAWINGS

The objects, advantages and effects as well as features of the present invention will be more readily understood from the following detailed description of an FSO system and an FSO transceiver according to embodiments of the invention when read together with the accompanying drawings, in which.

DETAILED DESCRIPTION

Figure 1:
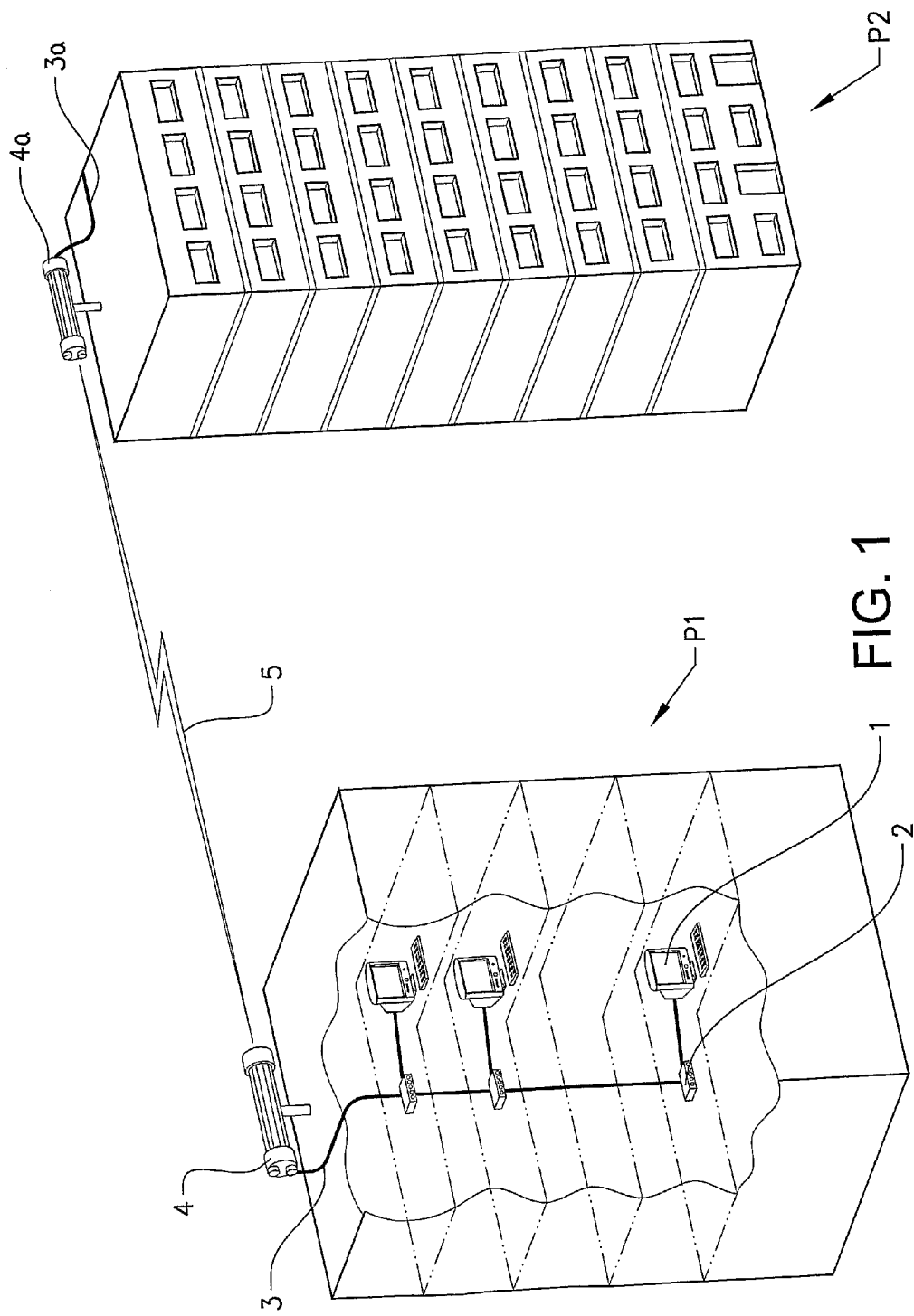
FIG. 1 schematically illustrate an embodiment of an FSO system.

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims.

Figure 2:
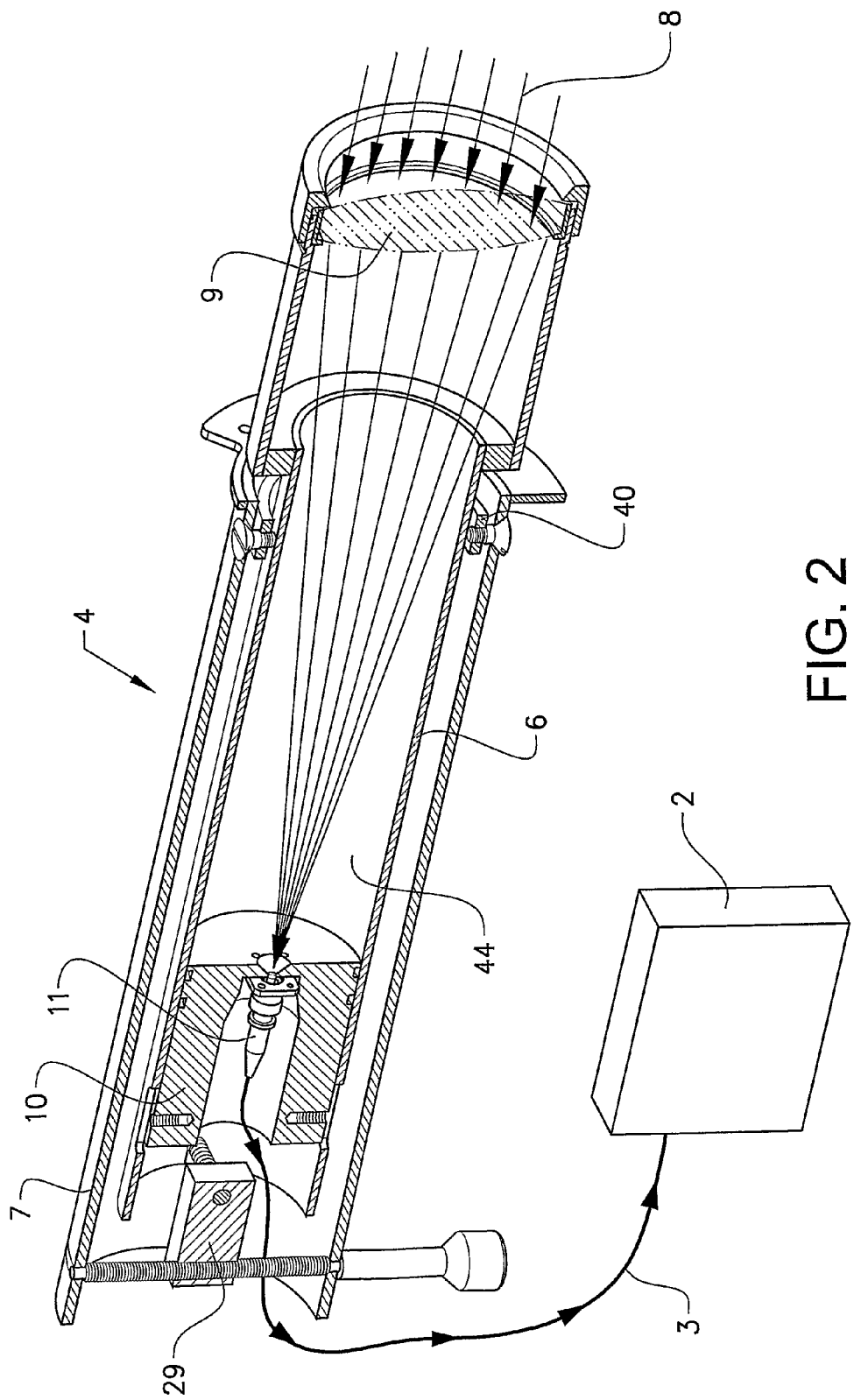
FIG. 2 shows a cut-away view of an embodiment of an FSO transceiver according to the invention.

FIG. 1 illustrates an example of the basic principle of an FSO system where data of a first LAN (Local Area Network) 1 based on e.g. Ethernet, Fast Ethernet, Gigabit Ethernet, an IEEE 802.11 standard and FDDI (Fiber Distributed Data Interface), is being sent via at least one transceiver device 2 up to a roof by an optical fiber 3, in the following description called the first optical fiber. The data is then transmitted by an FSO transceiver 4, in the following description called the first FSO transceiver, from a first building P1 to a corresponding, opposite, second FSO transceiver 4a. The second FSO transceiver 4a is located on or in a second building P2. The transmission from the first FSO transceiver is through electromagnetic waves emitted at a light wavelength and propagated as an optical signal through the air without beam guidance, thus forming an optical link 5 without physical contact between the first and the second FSO transceivers. The second FSO transceiver 4a transmits the optical signal to a second LAN (not shown) via a second optical fiber 3a. Since the illustrated example involves FSO transceivers, the communication may be bi-directional, as indicated in FIG. 2 showing the first FSO transceiver in more detail. It shall also be understood that instead of being connected to a LAN, the optical fibers, 3 and 3a, may be connected to other types of networks, e.g. WANs (Wide Area Networks) utilizing ATM (Asynchronous Transfer Mode) and/or SONET/SDS (Synchronous Optical NETwork/SONET Directory Service) or any other protocol being used by FSO technology.

Exemplary wavelengths transmitted by the FSO transceivers are infrared wavelengths for transmitting signals, hence generating non-visible, narrow and directional beams of light. The optical signals can be generated by a LASER (Light Amplification by Stimulated Emission of Radiation) or LED (Light Emitting Diode) system and the generated light should suitably comply with international safety norms so that it does not harm the sight of humans and animals. Some specific wavelengths are those that are commonly used for optical communication: wavelengths in the neighborhood of 850 nm, 1330 nm or 1550 nm. However, the wavelengths of the optical signals that fall within the scope of the invention include infrared, visible and ultraviolet wavelengths.

The shown FSO transceiver in FIG. 2 is an embodiment of the first FSO transceiver, but the second FSO transceiver 4a is suitably designed in the same way as the first FSO transceiver. The FSO transceivers are designed as units in a passive, low-cost, easy-to-install, FSO communications system with improved robustness against ambient temperature fluctuations. In this embodiment the first FSO transceiver comprises a tubular body 6 having a cylindrical inner wall 44 and a cylindrical outer wall and a tubular housing 7 with a cylindrical inner and outer wall. The tubular body 6 is suspended inside the housing 7 through a two-axis gimbal arrangement 40 between the tubular body 6 and the housing 7, in this embodiment at a forward end of the housing 7. In FIG. 2, substantially parallel rays 8 schematically illustrate energy transmission in the direction of electromagnetic wave propagation at the light wavelength, where an optical beam transmitted by the second FSO transceiver 4a reaches a lens 9 mounted in the tubular body 6. The lens 9 converges the parallel rays 8 so that they can reach a core of the aligned, first optical fiber fixed along a centre line of a passive, temperature compensation device 10 with the aid of a connector 11 for fitting the first optical fiber to the first FSO transceiver. From this point on, the energy from the rays 8 is transmitted to the transceiver device 2 of the first LAN 1 so that electro-optical conversion, optical amplification or signal repetition aiming at reaching longer distances or distances without straight line-of-sight can be performed. The convergence of the rays 8 by the lens 9 causes the rays 8 to form a "point" of a few micrometers in diameter at a known distance and with an area which is substantially the same or lower than the dimensions of the core of the first optical fiber, which is positioned and pre-adjusted "exactly" at that same known distance with the aid of the support offered by the temperature compensation device 10. Although the shown embodiments only comprise one lens 9, other embodiments of the invention may comprise more than one lens 9 for converging rays.

Figure 3:
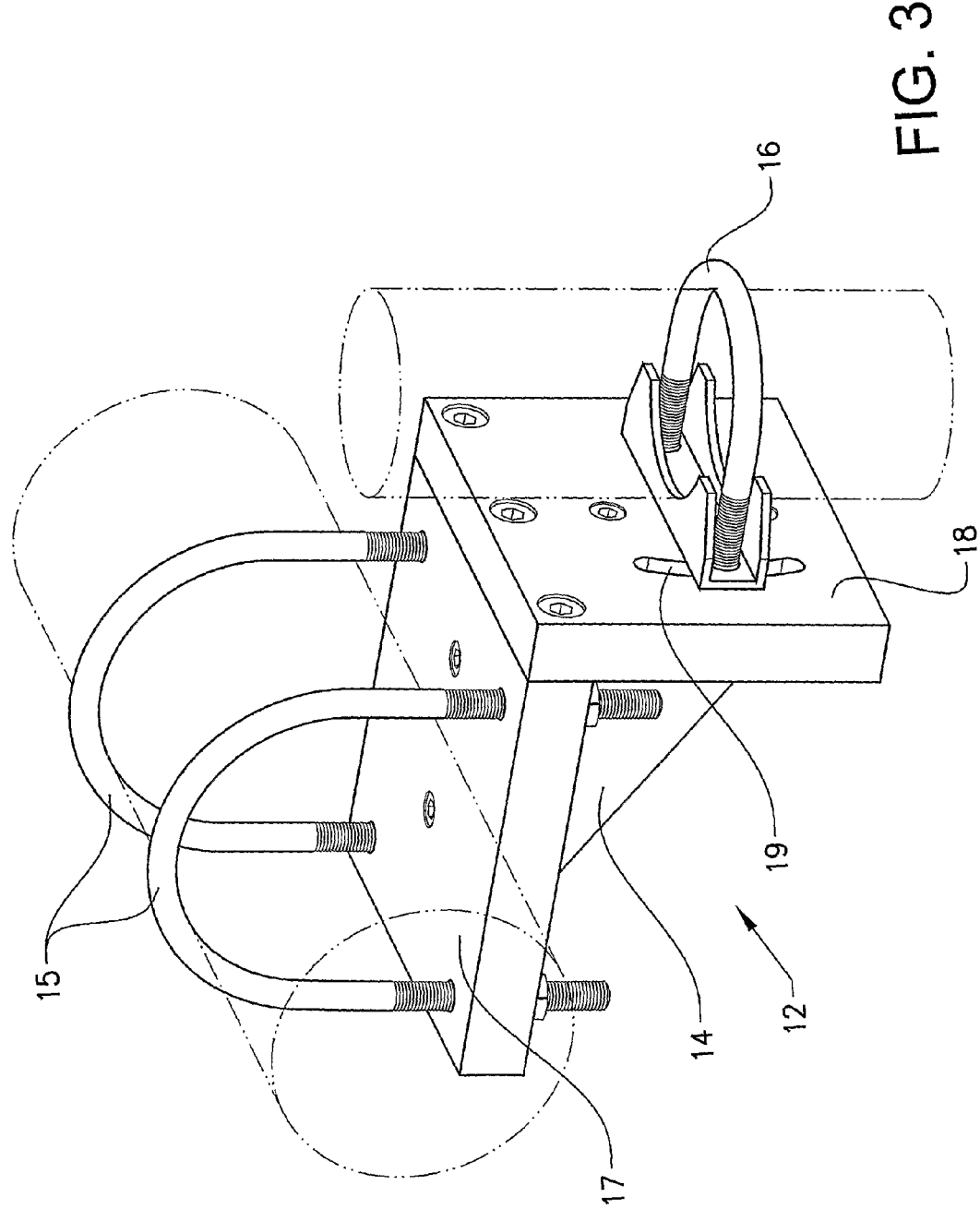
FIG. 3 shows a mounting support for embodiments of the FSO transceiver.

FIG. 3 illustrates the simplicity and practicality of the alignment adjustment that a fixation and mounting support 12 provides for the first FSO transceiver when mounting the first FSO transceiver to a fixed structure or anchoring support 13 (see FIG. 10), such as a tripod or a fixed cylindrical or rectangular pole. The mounting support 12 is here basically L-shaped to make it relatively light and easy to manufacture, but is also comprised of a reinforcing part 14 to improve the stiffness of the mounting support 12. A first set of clamps 15, here in the form of two U-shaped clamps with straight legs and a rounded central part, are utilized for fixation of the first FSO transceiver on the mounting support 12. A U-shaped, third clamp 16 is used for conveniently be able to fix and adjust the mounting support 12 around the fixed structure or anchoring support 13. Thereby the first FSO transceiver may easily be manually adjusted relatively to the opposite, second FSO transceiver 4a. The mounting support 12 comprises a first support surface 17 provided with through-holes for receiving the first set of U-shaped clamps 15 in order to fix the first FSO transceiver to the mounting support 12, e.g. by fixing the first FSO-transceiver directly against the mounting support 12. The mounting support 12 also comprises a second support surface 18 being perpendicular to the first support surface 17. The second support surface 18 is provided with a through-hole and an elongated and curved recess 19 into which the third clamp 16 can be inserted for fixing the mounting support 12 to the fixed structure or anchoring support 13. The legs of all the U-shaped clamps are here threaded in order to engage with nuts on the other sides of the first support surface 17 and second support surface 18 respectively. The recess 19 makes it possible to easily, and variably adjust the inclination of the first FSO transceiver, while the anchoring support 13, if cylindrical, enables the first FSO transceiver to be rotated and fixed at any position around the anchoring support 13 in the horizontal plane. The mounting support 12 thus makes it possible to obtain a very satisfying angle adjustment in azimuth as well as in elevation. A plurality of bore holes may in alternative embodiments be provided instead of the recess 19, but that would only provide step-by-step adjustment.

Figure 4:
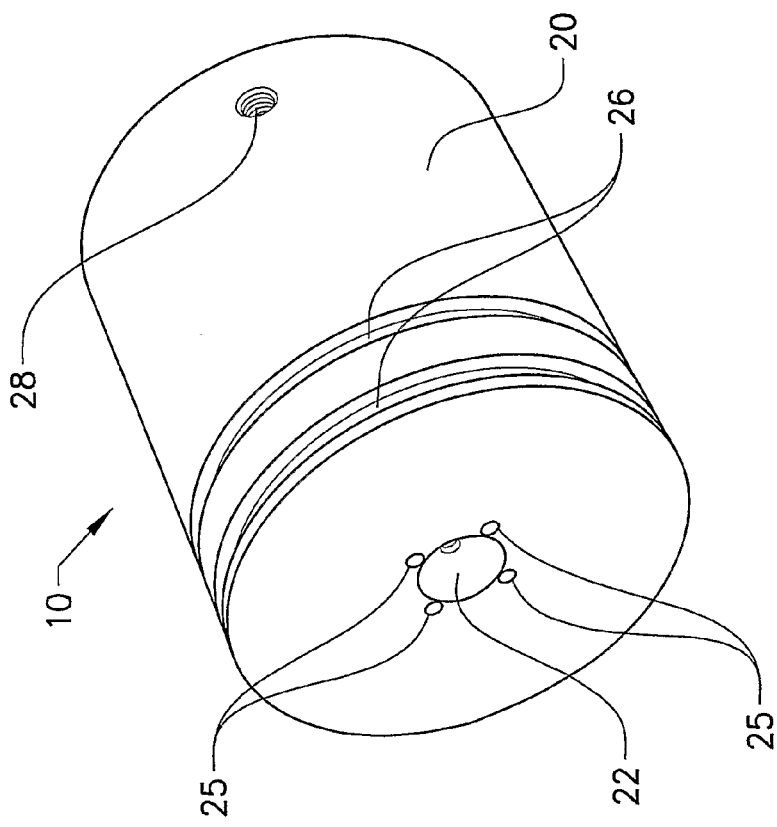
FIG. 4 shows an embodiment of a temperature compensation device.

FIG. 4 shows an embodiment of the temperature compensation device 10 in more detail. Expansion is being caused by the temperature differences to which the first FSO transceiver is exposed after its installation, these differences being caused by climatic and meteorological effects as well as artificial causes. The temperature compensation device 10 is here, but is not restricted to, a single-piece object of a polymer material having a generally cylindrical envelope surface 20 and a symmetric and concentric through hole with respect to the longitudinal axis of the temperature compensation device 10. The diameter of the cylindrical envelope surface 20 is smaller than the diameter of the inner wall 44 of the body 6 so that a small air gap is created between the temperature compensation device 10 and the body 6 when the temperature compensation device 10 is properly installed in the body 6. The shape of an inner surface of the temperature compensation device 10 which defines the through hole is adapted to enable insertion and installation of the connector 11 for the first optical fiber in the temperature compensation device 10 from a first end 21 of the temperature compensation device 10. The first end 21 is directed towards a rear end of the first FSO transceiver when the temperature compensation device 10 is installed in the body 6. The radius of the through hole is varying and a part of the inner surface is formed as an abutment 22 (see FIG. 5) for the connector 11 and is therefore perpendicular to the longitudinal direction of the temperature compensation device 10 in order to stop the connector 11 at a certain distance from a second end, hereinafter called the free end 23, of the temperature compensation device 10. A concentric frusto-conical aperture 24 for inlet of optical beams to the first optical fiber from the lens 9 and outlet of optical beams from the first optical fiber to the lens 9 is also a part of the through hole and positioned at the free end 23 of the temperature compensation device 10 with the largest cross sectional area of the aperture 24 being in line with the free end 23. The connector 11 may be more securely fixed to the temperature compensation device 10 by being provided with screw holes in the longitudinal direction of the connector 11 towards the abutment 22 and corresponding to through holes 25 between the free end 23 and the abutment 22. Screws may therefore be introduced in the through holes 25 from the free end and screwed into the screw holes in the connector 11 to prevent the connector 11 from being withdrawn from the temperature compensation device 10. The envelope surface comprises two parallel circumferential grooves 26 close to the free end 23 of the temperature compensation device 10. The grooves 26 are shaped so as to accommodate two O-rings 27 (see FIG. 6) of e.g. rubber in order to improve guidance and stabilize the position of the temperature compensation device 10 when it expands or contracts within the body 6. There are at least two screw holes 28 relatively near the first end 21 and projecting radially inwards towards the axis of symmetry/the longitudinal axis of the temperature compensation device 10.

Figure 5:
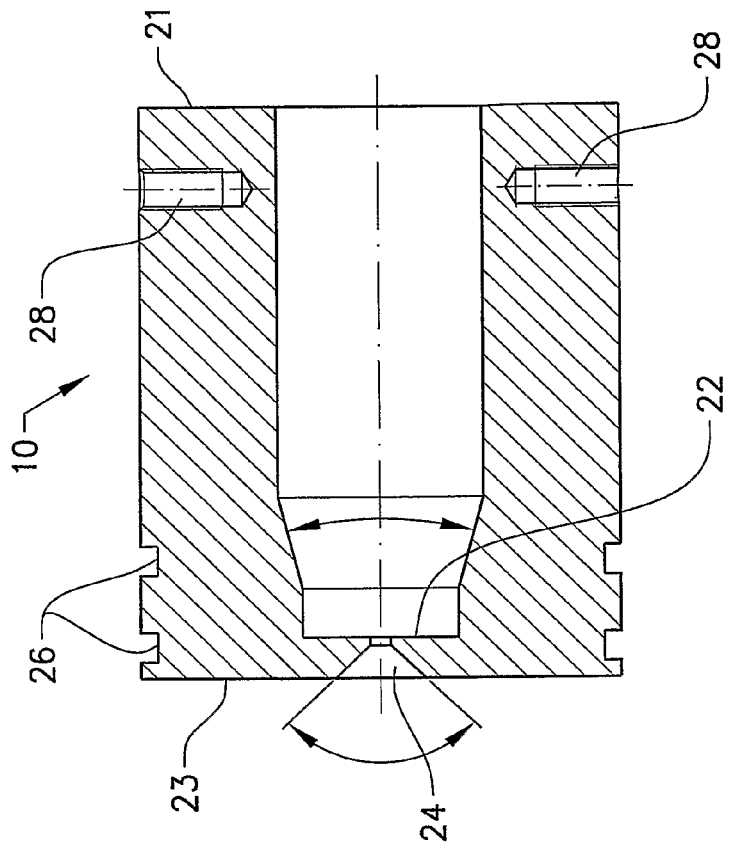
FIG. 5 is a cross sectional view in the longitudinal direction of the embodiment of the temperature compensation device.
Figure 6:
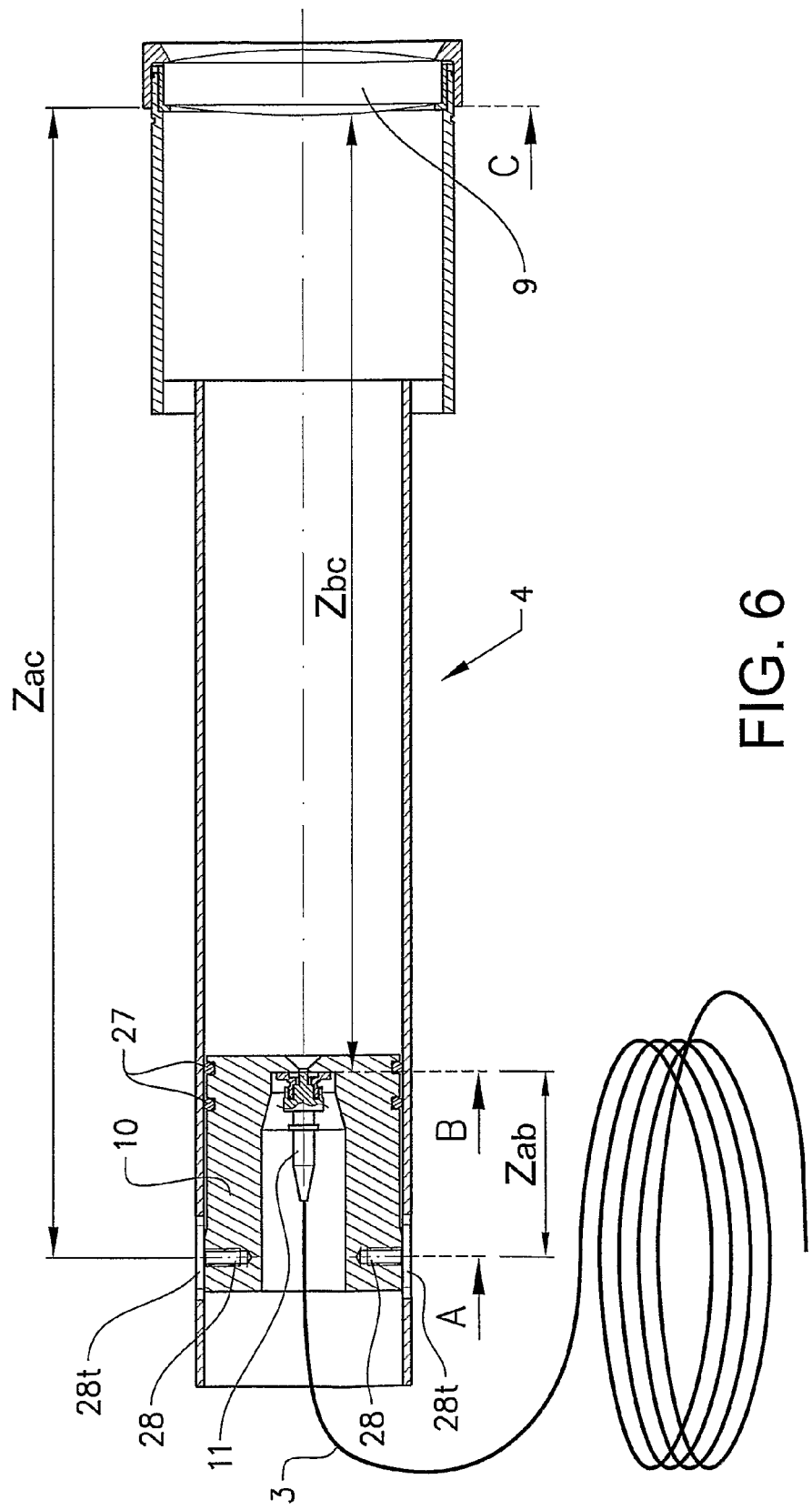
FIG. 6 is a cross sectional view of an embodiment of a body and the embodiment of the temperature compensation device.

FIG. 5 shows a cross-section of the temperature compensation device 10 and FIG. 6 is a cross sectional view of the temperature compensation device 10 installed in the body 6. As seen in these Figs the temperature compensation device 10 is only fixed close to the first end 21 more precisely where fastening means, here in the form of screws, are inserted into holes 28t, which may be elongated, in the body 6 and the corresponding screw holes 28 in the temperature compensation device 10 at a third position A indicated by FIG. 6. The free end 23 is thus completely free in the longitudinal direction of the FSO transceiver so that the temperature compensation device 10 can smoothly slide inside the body 6 without losing its alignment.

FIG. 6 also shows a second position B and a first position C which will aid in the explanation of distance variations between the temperature compensation device 10 and the body 6 in the first FSO transceiver. The second position B is in the longitudinal direction of the body 6 the position of a forward end of the connector 11, i.e. the position of the abutment 22. The first position C is a predetermined position on the lens 9, here the position for an inner surface of the lens 9 directed inwards in the body 6. FSO transceivers, generally no matter the material used in their manufacture, undergo considerable dimension variations whenever the ambient temperature is changed, by contracting or expanding said materials. This could not be acceptable for an FSO transceiver having such a simple and low cost optics as the disclosed embodiments of the first FSO transceiver, since means for fastening a connector in the second position B between the first position C and the third position A have to have a shorter length within the body 6 than the body itself since such means would otherwise obstruct the optical signals between the first optical fiber and the lens 9. Said contraction and expansion alter a distance Zac between the third position A and the first position C, causing the end of the connector 11 of the first optical fiber to deviate from its ideal focal point, the first optical fiber being shifted forward or backward relative to the lens 9. Consequently energy is wasted for light coupling, the end result being reduced dynamics and lower availability of the FSO system as a whole. A distance Zbc between the second position B and the first position C should therefore be maintained as much as possible. Therefore the temperature compensation device 10 is manufactured of a material the expansion coefficient of which is higher than that of the body 6. The difference in expansion coefficients of the temperature compensation device 10 and the body 6 should ideally be exactly proportional to the difference between the physical dimensions of the temperature compensation device 10 and the body 6. The basis for this finding is the linear nature of thermal expansion/compression that leads to expansion relationship for length, area and volume in terms of a linear expansion coefficient. If the temperature difference ΔT, is such that the material does not go through a phase change, then it can be shown that the change in the object's length ΔZ, is given by the equation:

$$\Delta Z = Z_0 \alpha \Delta T$$

where $Z_0$, is the initial length of the object before heat is added, and $\alpha$, is the linear expansion coefficient of the material.

Thus, since both the temperature compensation device 10 and the body 6 are fixed at the same reference position, i.e. the third position A, and the body 6 undergoes a change which alter the distance Zac between the third reference position A and the first reference position C, the temperature compensation device 10 will change its distance Zab between the third position A and the second position B so as to striving to keep the distance Zbc between the second position B and the first position C unchanged. The temperature compensation device 10 is thus a highly precise and low cost device which enables a high transmission rate, passive, low-cost FSO transceiver and thus a low cost FSO communications system to be operated under suitable conditions, keeping its availability and operation margins for a large temperature range, provided that the expansion coefficient of the temperature compensation device 10 is higher than the expansion coefficient of the body 6 and suitably that the quotient between the expansion coefficient of the temperature compensation device 10 and the expansion coefficient of the body 6 is as close as possible to the quotient of the length of the body from the third position A to the first position C and the length of the temperature compensation device from the third position A to the second position B. Due to its passive nature, the passive compensation device does not add any significant cost to the manufacture of the FSO transceiver, firstly because it does not require additional devices for control and actuation or embedded electronics, but also because of the internal support provided by the temperature compensation device 10 for the connector 11 of the first optical fiber. The temperature compensation device 10 provides real-time dimensions adjustment between the forward end of the connector 11 of the first optical fiber and the lens 9 in a simple, precise way of the order of micrometers in linear variation.

For example, in an embodiment according to what is disclosed above, the body 6 may be manufactured using an aluminum alloy, e.g. the wrought aluminum alloy 6061, which is a commonly used alloy of the 6000 series aluminum alloys (according to the International Alloy Designation System). Alloy 6061 is a versatile heat treatable extruded alloy with medium to high strength capabilities and is commonly produced in several heat temper grades, e.g. 6061-O, 6061-T4, 6061-T6, 6061-T651 and 6061-T42. The linear expansion coefficient, also known as the coefficient of linear thermal expansion, for a typical aluminum alloy 6061 is $2.35 \times 10^{-5}$ °C.$^{-1}$. For manufacture of the temperature compensation device, polymer materials can be used, such as thermoplastic polypropylene copolymer, which has good impact properties even at low temperatures and slightly increased elongation at break compared with unmodified polypropylene homopolymer. In other words the thermoplastic polypropylene copolymer preserves better elastic features at relatively low temperature compared to unmodified polypropylene homopolymer. Examples of commercially available and relevant copolymers are polyurethanes, polyetheresters, and polyetherblock-amides, e.g. Estane®, Hytrel®, PEBAX®, ABS plastic, SBR, styrene-isoprene-styrene (SIS) and ethylene-vinyl acetate. However the scope of the invention of course also comprises any material with higher linear expansion coefficient than the material of the body, including unmodified polypropylene homopolymer. For example, all polymers that have a thermal expansion coefficient approximately as thermoplastic polypropylene copolymer for a solid state, which generally is in the range of −40°~120° C., can be used. A typical linear expansion coefficient for thermoplastic polypropylene copolymer is $10 \times 10^{-5}$ °C.$^{-1}$. If, for the aluminum alloy body, the Zac distance in FIG. 6 is 300 mm at 24° C., the Zab distance for the temperature compensation device of thermoplastic polypropylene Copolymer must be 70.5 mm at 24° C., for perfect compensation of the device. The following four examples of different ambient temperatures illustrate three cases of expansion or contraction of the body 6 and the temperature compensation device 10 if the above exemplary materials are used.

Case I: Ambient temperature 24° C. (the same as above)

$$Zbc = Zac - Zab = 300 - 70.5 \text{ mm} = 229.5 \text{ mm}$$

Case II: Ambient temperature 50° C.

$$\Delta Zac = Zac\, \alpha\, \Delta T = 300 \text{ mm} \times 2.35 \times 10^{-5} \text{ °C.}^{-1} \times (50° \text{C.} - 24° \text{C.}) = 1.833 \text{ mm}$$

$$\Delta Zab = Zab\, \alpha\, \Delta T = 70.5 \text{ mm} \times 10 \times 10^{-5} \text{ °C.}^{-1} \times (50° \text{C.} - 24° \text{C.}) = 1.833 \text{ mm}$$

$$Zbc = (Zac + \Delta Zac) - (Zab + \Delta Zab) = 301.833 - 72.333 = 229.5 \text{ mm}$$

Case III: Ambient temperature 0° C.

$$\Delta Zac = Zac\, \alpha\, \Delta T = 300 \text{ mm} \times 2.35 \times 10^{-5} \text{ °C.}^{-1} \times (0° \text{C.} - 24° \text{C.}) = -1.692 \text{ mm}$$

$$\Delta Zab = Zab\, \alpha\, \Delta T = 70.5 \text{ mm} \times 10 \times 10^{-5} \text{ °C.}^{-1} \times (0° \text{C.} - 24° \text{C.}) = -1.692 \text{ mm}$$

$$Zbc = (Zac + \Delta Zac) - (Zab + \Delta Zab) = 298.308 - 68.808 = 229.5 \text{ mm}$$

Case IV: Ambient temperature −20° C.

$$\Delta Zac = Zac\, \alpha\, \Delta T = 300 \text{ mm} \times 2.35 \times 10^{-5} \text{ °C.}^{-1} \times (-20° \text{C.} - 24° \text{C.}) = -3.102 \text{ mm}$$

$$\Delta Zab = Zab\, \alpha\, \Delta T = 70.5 \text{ mm} \times 10 \times 10^{-5} \text{ °C.}^{-1} \times (-20° \text{C.} - 24° \text{C.}) = -3.102 \text{ mm}$$

$$Zbc = (Zac + \Delta Zac) - (Zab + \Delta Zab) = 296.898 - 67.398 = 229.5 \text{ mm}$$

The thermal expansion coefficient of substantially isotropic, i.e. uniform properties in all directions, materials, such as thermoplastic polypropylene copolymer does not vary significantly in the solid state (−40° C.~120° C.) with temperature.

Hence the distance Zbc is exactly the same in the four cases above. Although the example above relates to the aluminum alloy 6061, other metal alloys may be used for the body 6 and the housing 7, such as other aluminum alloys of the 6000 series, the 2000 series, the 5000 series and 7000 series and steel.

The dimension of the air gap between the body 6 and the temperature compensation device 10 is suitably dependent on maximum and minimum temperatures that the first FSO transceiver is constructed to work in. For example, inside the body 6 of an aluminum alloy 6061 the envelope surface 20 of the temperature compensation device 10 of a copolymer having a linear expansion coefficient of $10 \times 10^{-5}$ °C.$^{-1}$ may be 58 mm for a temperature range of 100° C., which approximately requires the air gap to be 2.2 mm. Suitably, the greater the air gap, the larger should the cross sectional diameter of the O-rings 27 be to keep the temperature compensation device 10 concentric with the body 6 and the alignment of the first FSO transceiver. The diameter of the envelope surface should be smaller than the diameter of the inner wall 44 of the body 6 because expansion coefficient is a three-dimensional thermodynamic property as there is also an area thermal expansion and volumetric thermal expansion. Usually metals and polymers are isotropic so that the thermal expansion coefficient need only be referenced along a single dimension.

Figure 7:
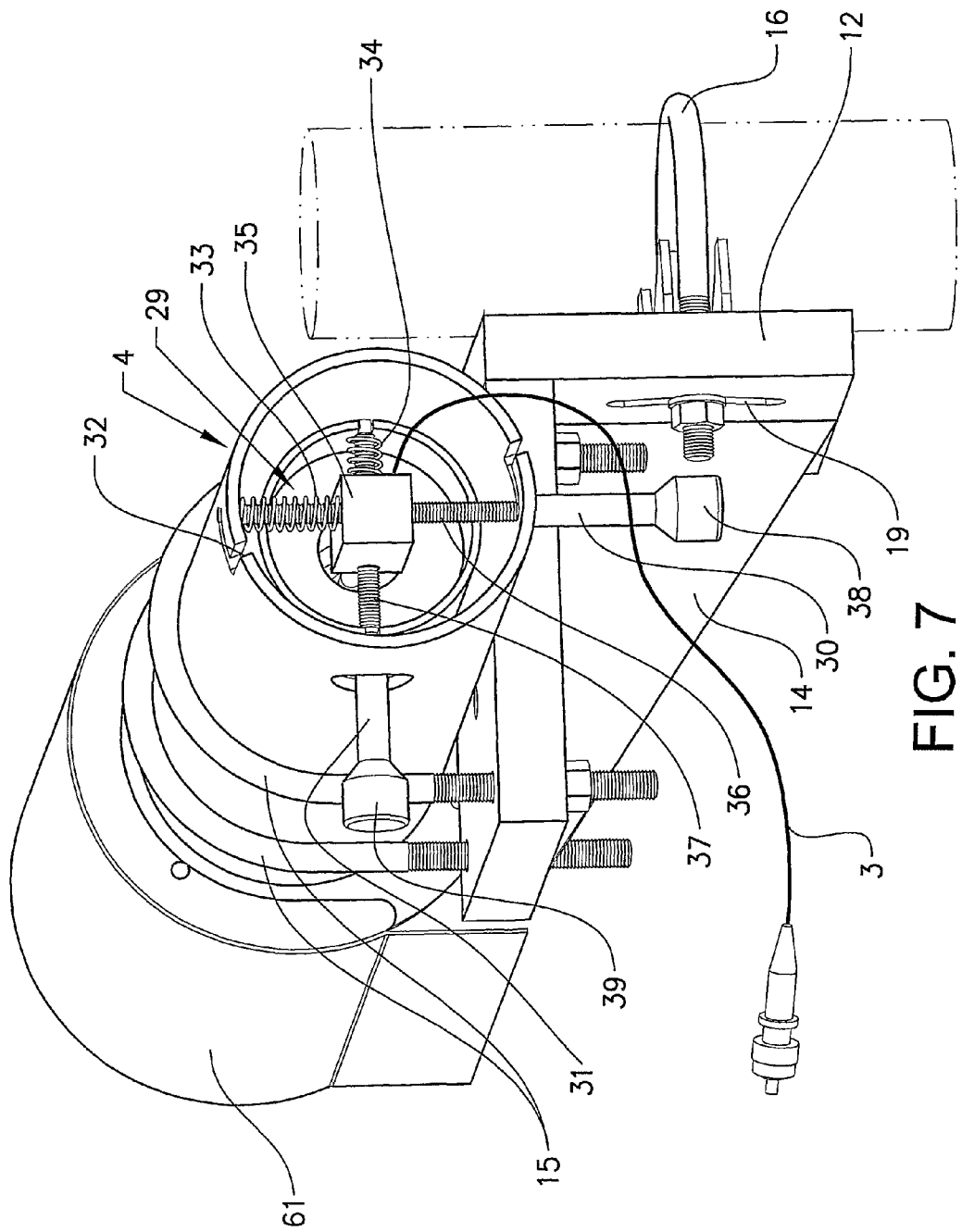
FIG. 7 is a perspective view showing an embodiment of a fine setting arrangement.

Once the mounting support 12 is installed and the first FSO transceiver is adjusted, the correct direction of the first FSO transceiver can be more accurately adjusted with the aid of a fine setting arrangement 29 comprised in the first FSO transceiver, here at a rear end of the first FSO transceiver and discussed more in detail in conjunction with FIG. 7. The fine setting arrangement 29 comprises two shafts, 30 and 31, positioned perpendicular to each other and substantially to the longitudinal centre axis of the first FSO transceiver. One of the shafts, in the shown embodiment the generally vertical shaft 30, is journalled in the housing 7 at two positions. At a distance in the longitudinal direction of the first FSO transceiver, in order to not interfere with the vertical shaft 30, the generally horizontal shaft 31 is journalled in the body 6 at two positions and projecting radially out from the housing 7 through a corresponding hole in the housing 7. The shafts 30, 31 can hereby be rotated around their respective longitudinal axis. In order to easily mount the shafts (and dismount in case of maintenance service), the housing 7 is provided with an L-shaped slot 32 into which the vertical shaft 30 is introduced. The body 6 may have two straight slots (not shown) for providing an easy installation for the generally horizontal shaft 31. The fine setting arrangement 29 also comprises, mounted inside the housing 7, at least one helical spring, 33 and 34, for each one of the shafts 30, 31 and an adjustment element 35 in the form of a solid block provided with two perpendicular screw threaded through-holes. The shafts 30, 31 comprise screw threaded parts 36, 37 engaged with the corresponding screw threaded through-holes in the adjustment element 35. By rotating the shafts, the interrelationship between the housing 7 and the body 6 can be adjusted. The helical springs 33, 34 are mounted around a part of their respective screw threaded part of the shafts 30, 31 and with one end in spring loaded contact with the inner wall of the housing 7 and the body 6 respectively. The other end of the helical springs 33, 34 are in spring loaded contact with the adjustment element 35 mainly in order to improve the stabilization of the position of the adjustment element 35 by increasing the engagement between the screw threads of the screw threaded parts 36, 37 of the shafts 30, 31 and the corresponding screw threaded through holes of the adjustment element 35. In other words the helical springs reduce slack between the shafts 30, 31 and the adjustment element 35 so that the first FSO transceiver can be more accurately adjusted and "auto-locked" after final adjustment. Each one of the two shafts 30, 31 also comprises at least one portion, 38 and 39 intended to be grasped by a person making the fine adjustment. In the shown embodiment in FIG. 7, these portions, 38 and 39, are adapted to improve the grip around the shafts 30 and 31, by being serrated, grooved and/or provided with small, rounded projections/bulges and positioned at one of the ends of each shaft 30 and 31, but the portions 38 and 39 may of course in other embodiments be positioned at other positions of the shafts 30 and 31. Alternatively, or in addition to serrations, grooves and bulges, the portions may be provided with rubber or any other material that would increase the grip around the portions when tuning the position of the first FSO transceiver. The two-axis gimbal arrangement 40 enables movement in any angle or direction of the tubular body 6 in relation to the housing 7 and minimizes the effect of movement influence caused between the shafts 30, 31 when the shafts are separately adjusted.

Figure 8:
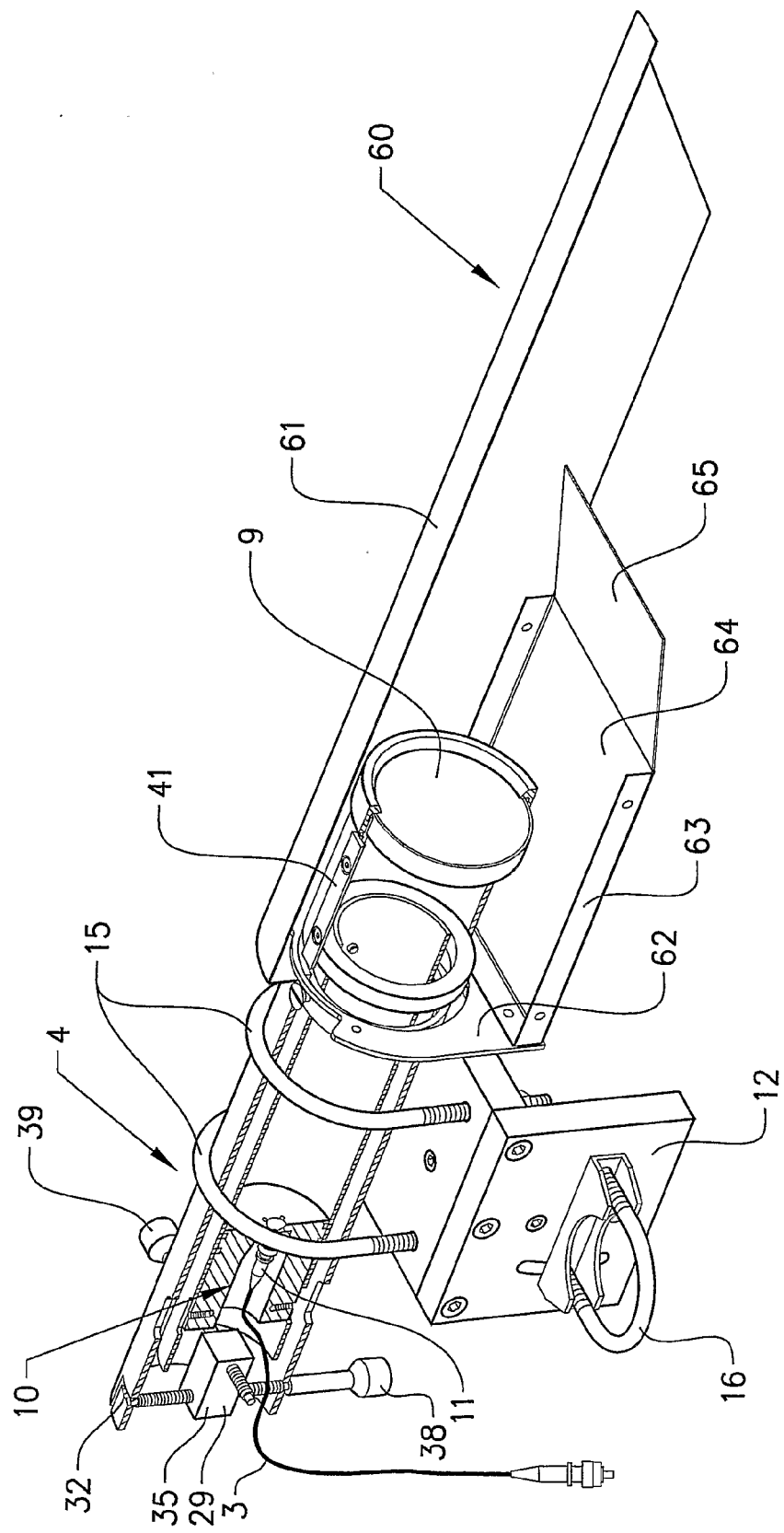
FIG. 8 shows a perspective and partly cut-away view of the embodiment of the FSO transceiver.
Figure 9:
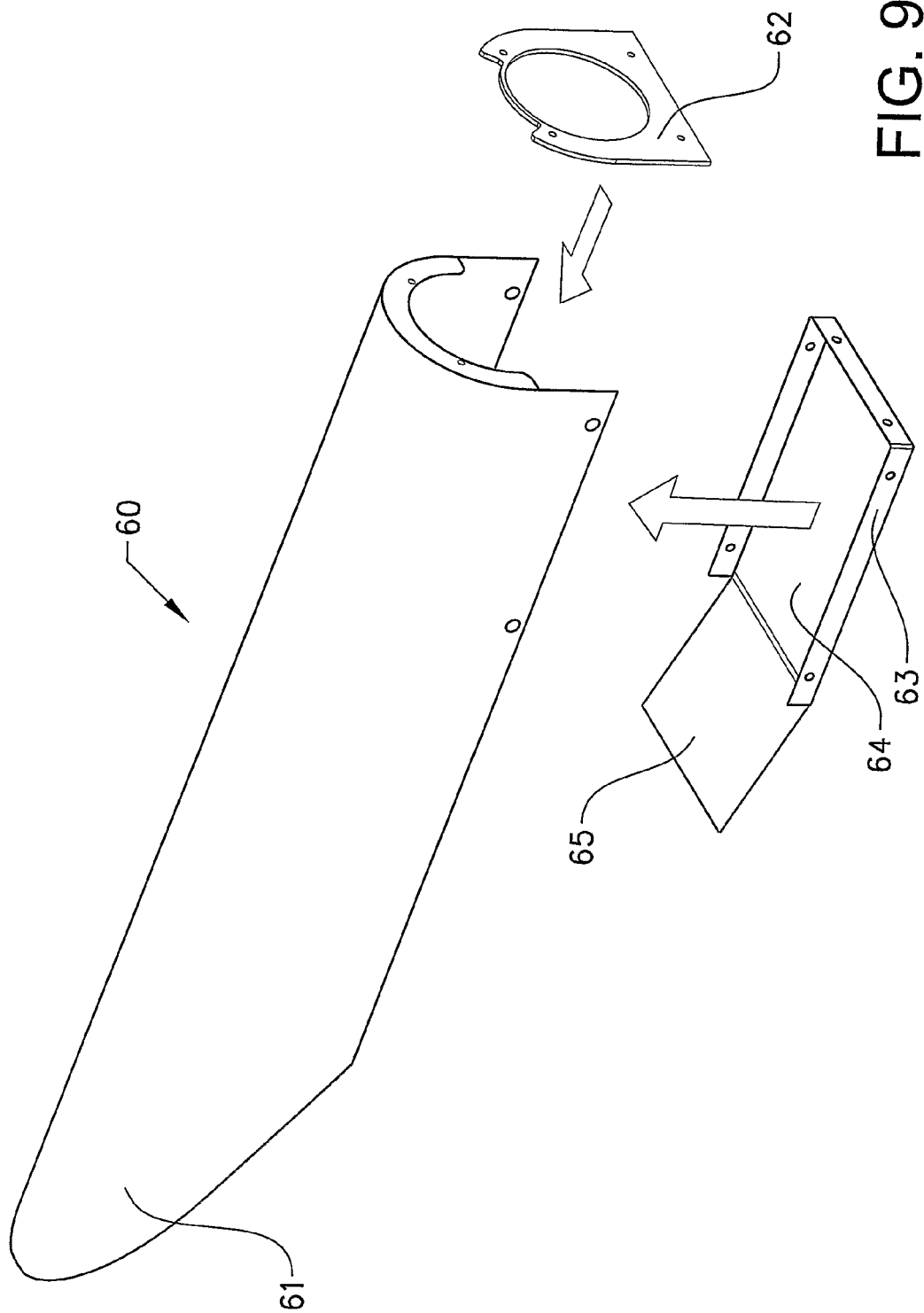
FIG. 9 shows an embodiment of a protection device.
Figure 10:
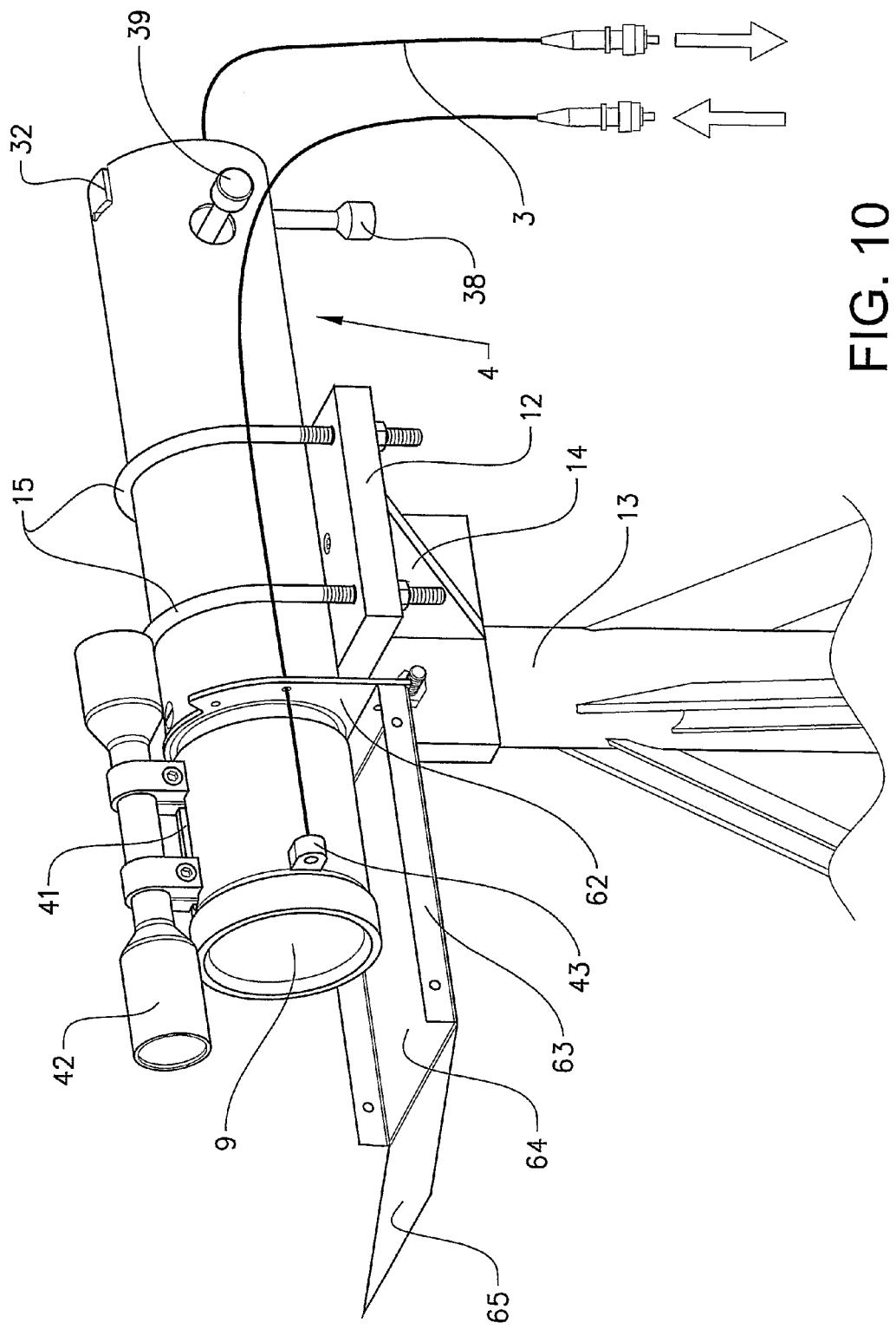
FIG. 10 is a perspective view of the embodiment of the FSO transceiver when mounted on an anchoring support, and FIG. 11 schematically shows a method according to the invention.

FIG. 8 shows another view of the first FSO transceiver, although parts of the first FSO transceiver have been removed for further explanation of embodiments. The first FSO transceiver here also comprises an optional mounting rail 41 fitting with a telescopic sight 42 (see FIG. 10) used for improving the work of aligning the first FSO transceiver with the second FSO transceiver 4a. The mounting rail 41 is suitably positioned close to a forward end of the body 6. The first FSO transceiver also comprises an optional protection device 60 which provides the first FSO transceiver with improved protection from e.g. rain, hail and other meteorological effects and birds nesting in front of the lens 9. The protection device 60 may be made up of plastics or aluminum or a similar light material so that the protection device 60 does not significantly add weight to the first FSO transceiver. It would thus be possible to avoid harmful vibrations or gusts of wind to the FSO system including the anchoring support 13. As seen in more detail in FIG. 9, the protection device in this embodiment comprises three parts. One of the three parts is an elongated shielding part 61 with a generally U-shaped cross-section forming an upper semi-cylindrical portion and straight side portions. The elongated shielding part 61 partly overlaps the body 6, but also projects out from the forward end of the body 6 so as to form a cap for the lens 9. The upper semi-circular portion of the shielding part 61 helps to prevent building up of water and dirt on top of the protection device 60 and the first FSO transceiver as well as e.g. the anchoring support 13 if positioned beneath the first FSO transceiver. A second part of the protection device is an end sheet 62 provided with a circular hole that fits an outer wall of the body 6, so that the end sheet 62 can be mounted around the body 6. A third part of the protection device 60 is a flanged plate 63 having three mounting flaps being perpendicular to a rectangular bottom 64 for mounting the flanged plate 63 to the end sheet 62 and the shielding part 61. A fourth flap 65, which projects out and upwards from a forward side of the rectangular bottom 64, forms in this embodiment a 15° angle with the rectangular bottom 64. The fourth flap 65 is intended to protect against splashes of rain or bird's nests in front of the lens. All the three parts of the protection device 60 are mounted together and fixed to the body 6 through the end sheet 62, which may be provided with fastening arrangements to securely fix the protection device 60 to the body 6. The attachment of the three parts to each other and to the body 6 is suitably done with bolts and nuts or self-screwing bolts so that a single person can withdraw and reinstall the protection device 60 in an easy way and with a reduced risk of affecting the alignment of the first FSO transceiver. As seen in FIGS. 8 and 10, the shielding part 61 would be positioned over the mounting rail 41 when installed, so the shielding part 61 has to be removed before the telescope is mounted on the mounting rail 41. However, the disclosed embodiment enables the end sheet 62 and the flanged plate 63 to still be fixed to the body 6 during the installation of the telescopic sight 42.

Although not shown in any of the figures, the rectangular bottom 64 may be provided with one or more draining apertures that allow water and e.g.

mud particles that may have entered the area circumvented by the protection device 60 to escape from the interior of the protection device. Also, in order to avoid that snow and hail stay on the flanged plate 63, the flanged plate may be heated by an electrical warming circuit, which of course also could be used to warm up the body in order to compensate for possible negative effects on the FSO transceiver when the ambient temperature would be below a certain temperature where the expansion coefficient of the body 6 and the temperature compensation device 10 is not sufficiently constant. Although the angle in this embodiment is 15° between the bottom 64 and the fourth flap 65, other angles may of course be suitable dependent on the general dimensions of the protection device 60 relatively to the body 6. Also, in other embodiments of the invention the mounting rail 41 may be positioned at other positions of the first FSO transceiver, e.g. on the housing 7, although this gives less precision, or at a more rearward position on the body 6, as long as the more rearward position is not covered by the protection device 60.

FIG. 10 shows another view of the first FSO transceiver mounted on the anchoring support 13 in the form of a stand of steel bars, pipes or iron ducts, via the mounting support 12. The outer dimension of the bars/pipes/ducts to which the mounting support 12 is attached is suitably pre-established. Also shown in FIG. 10 is a collimator 43 in the form of a large area collimator with adjustable aperture. The collimator 43 can be used as a system of alignment with a visible wavelength laser and used to send parallel rays to the second FSO transceiver 4a. In the same manner a collimator installed in the second FSO transceiver 4a may send a beam of parallel rays to the first optical fiber via the lens 9 in order to help the aligning the body 6 with respect to the second FSO transceiver 4a. In the shown embodiment the collimator 43 is installed at the side of the lens 9 and preferably positioned so as to also be protected against rain etc by the protection device 60.

Having described low-cost, passive and easy-to-install embodiments of the invention, it must also be said that a temperature compensation device according to the invention may of course also be installed in FSO transceivers provided with active control means for automatically aligning the FSO transceivers.

Figure 11:
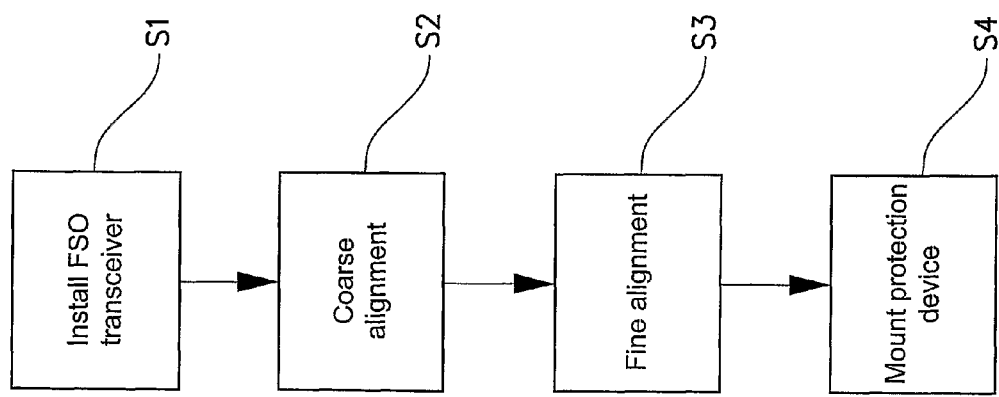

A method which provides a simple way of installing and aligning a passive FSO transceiver according to the above embodiments will now be described in conjunction with FIG. 11.

A first step S1 comprises the mounting of the mounting support 12 on the anchoring support 13 and fixing the first FSO transceiver on the mounting support 12 with the help of nuts and the corresponding first set of clamps 15 and the third clamp 16. The first FSO transceiver can be pre-assembled before the first step S1, including the optional protection device 60. However, if the telescopic sight 42 and the protections device 60 are utilized in a second step S2 (see below) and the mounting rail 41 is positioned adjacent to the forward end of the body 6 as shown in FIG. 8, the shielding part 61 is not mounted yet, although the end sheet 62 and the flanged plate 63 may have already been attached in the assembly process of the first FSO transceiver.

A second step S2 comprises a manual, "coarse", first alignment of the first FSO transceiver with the position of the second FSO transceiver 4a, which may already have been installed, before the third clamp 16 is "finally" tightened around the anchoring support 13. In one embodiment the optional telescopic sight 42 is connected to the mounting rail 41. Through the telescopic sight 42 the alignment of the first FSO transceiver relatively to the second FSO transceiver 4a can be checked and set so that the first FSO transceiver is centralized with the aid of a reticle of the telescopic sight 42. Thereafter the third clamp 16 is finally tightened around the anchoring support 13. Before a fine setting, second alignment is made in a third step S3, steps corresponding to the first and/or the second step may be performed also for the second FSO transceiver 4a.

In one embodiment of the third step S3, where the telescopic sight 42 has been attached to the first FSO transceiver, the second alignment is performed with the help of observations through the telescopic sight 42. By rotating the shafts 30 and 31 of the fine setting arrangement 29 a fine setting of the first FSO transceiver relative to the center of a corresponding lens 9 of the second FSO transceiver can be achieved. Once the fine setting is done, the telescopic sight 42 is detached and could be reused when adjusting the alignment of the second FSO transceiver relative to the first FSO transceiver. After the third step S3, a fourth step S4 may be performed.

In a second embodiment of the third step S3, the telescopic sight is not used or present. Instead a laser or LED system that emits light in the visible spectrum, such as the collimator 43, can be placed on any one of the first and second FSO transceiver for reception or transmission of light. By looking where a light beam created by the laser or LED system hits the opposite FSO transceiver, the fine setting may be performed through the fine setting arrangement 29 so that the light beam hits the center of the lens on the opposite FSO transceiver. If the shielding part 61 is not attached on the first FSO transceiver, the fourth step S4 may be performed.

A third embodiment of the third step S3 generally requires more expertise from a person than the two above embodiments of the third step. In this embodiment an optical signal is sent from the second FSO transceiver 4a towards the first FSO transceiver or vice versa and then monitoring at the opposite end of the free space link the level of the optical signal received by the other FSO transceiver (e.g. the first FSO transceiver) with the aid of dedicated measurement devices/units known in the art, such as devices comprising CCD (Charged-coupled Device), quadcells or photodiodes, or even by means of the other FSO transceiver itself. The latter can be done if one or both of the first and second FSO transceiver is provided with an embedded receiver signal counter. By adjusting, with the help of the fine setting arrangement 29, the direction so that an optical signal with the highest power is received, the fine alignment can be performed. In case the shielding part 61 is not yet installed, the fourth step S4 may be performed. The sent optical signal may be a visible light signal sent by the collimator 43.

The method may of course also comprise any practical alternative to the three above embodiments of the third step S3, such as making the fine adjustment with all or any combination of the telescopic sight 42, laser/LED system and optical signal measurement.

In the fourth step S4 the shielding part 61 is being mounted on the first FSO transceiver. The fourth step S4 is unnecessary if the shielding part 61 is not considered to be required or if the shielding part 61 already is pre-mounted before the first step S1.

As should be understood from the description of the method above, the utilization and installation of passive FSO transceivers according to disclosed embodiments create a "plug and play" configuration which does not require experts to install such FSO transceivers. The end-user should be perfectly able to install and align such FSO transceivers.

Although not shown in any drawings, other embodiments of the invention may comprise a tubular body and housing having rectangular or quadratic cross sectional areas or nontubular embodiments. The temperature compensation device may have another shape than the one disclosed in the drawings, e.g. shaped as a rectangular parallelepiped with or without a through hole for insertion of a connector.

The invention claimed is:

1. An FSO transceiver comprising a body, at least one lens fixed to the body in a first position and a single-piece temperature compensation device for attaching a connector for an optical fiber at a second position at a predefined distance to the lens, the lens being adapted to converge rays of light sent to the FSO transceiver into the optical fiber, and wherein said temperature compensation device has an expansion coefficient that is higher than an expansion coefficient of the body and is fixed to the body in a third position, and further wherein said temperature compensation device has a free end that is not fixed to the body and allows the temperature compensation device to expand and contract according to temperature changes, to maintain the position of the optical fiber relative to the lens.

2. The FSO transceiver of claim 1, wherein the body is tubular and the lens and the temperature compensation device are attached inside the body.

3. The FSO transceiver of claim 2, wherein the temperature compensation device is a tubular element comprising a generally cylindrical envelope surface having a smaller diameter than an inner wall of the body and an abutment for the connector inside the temperature compensation device.

4. The FSO transceiver of claim 3, wherein the envelope surface comprises at least one circumferential groove for retention of an O-ring for each circumferential groove.

5. The FSO transceiver of claim 1, further comprising a manually operated fine setting arrangement for adjusting a direction of the FSO transceiver.

6. The FSO transceiver of claim 1, further comprising a protection device which is adapted to at least partly protect the lens from precipitation.

7. The FSO transceiver of claim 1, further comprising a mounting rail on the body for a telescopic sight.

8. The FSO transceiver of claim 1, wherein the body is made of an aluminum alloy and the temperature compensation device is of a polymer material.

9. The FSO transceiver of claim 8, wherein the body is made of a 6000 series aluminum alloy and the temperature compensation device is of polypropylene.

10. The FSO transceiver of claim 9, wherein the body is made of aluminum alloy 6061 and the temperature compensation device is of polypropylene copolymer.

11. The FSO transceiver of claim 1, wherein the ratio between the expansion coefficients of the body and the temperature compensation device is substantially the same as the ratio between the distance from the third position to the second position and the distance from the third position to the first position.

12. The FSO transceiver of claim 1, wherein the FSO transceiver is passive.

13. The FSO transceiver of claim 1, wherein the temperature compensation device comprises a tubular element.

14. An FSO transceiver comprising a body, at least one lens fixed to the body in a first position and a temperature compensation device for attaching a connector for an optical fiber at a second position at a predefined distance to the lens, the lens being adapted to converge rays of light sent to the FSO transceiver into the optical fiber, and wherein said temperature compensation device has an expansion coefficient that is higher than an expansion coefficient of the body and is fixed to the body in a third position, and further wherein said temperature compensation device has a free end that is not fixed to the body and allows the temperature compensation device to expand and contract according to temperature changes, to maintain the position of the optical fiber relative to the lens, wherein the ratio between the expansion coefficients of the body and the temperature compensation device is substantially the same as the ratio between the distance from the third position to the second position and the distance from the third position to the first position.

* * * * *